United States Patent
Gunther

(10) Patent No.: US 8,959,520 B2
(45) Date of Patent: Feb. 17, 2015

(54) DATA PROCESSOR WITH PERFORMANCE CONTROLS

(75) Inventor: Peter Gunther, Cadolzburg (DE)

(73) Assignee: Siemens Aktiengesellschaft, München (DE)

( * ) Notice: Subject to any disclaimer, the term of this patent is extended or adjusted under 35 U.S.C. 154(b) by 1997 days.

(21) Appl. No.: 11/523,397

(22) Filed: Sep. 18, 2006

(65) Prior Publication Data

US 2007/0101337 A1 May 3, 2007

(30) Foreign Application Priority Data

Sep. 26, 2005 (DE) .......................... 10 2005 045 904

(51) Int. Cl.
*G06F 9/46* (2006.01)
*G06F 9/48* (2006.01)
*G06F 11/34* (2006.01)

(52) U.S. Cl.
CPC ............ *G06F 9/485* (2013.01); *G06F 11/3466* (2013.01)
USPC .......................... 718/103; 718/102; 718/104

(58) Field of Classification Search
None
See application file for complete search history.

(56) References Cited

U.S. PATENT DOCUMENTS

| 5,355,484 | A | * | 10/1994 | Record et al. ................. | 717/127 |
|---|---|---|---|---|---|
| 5,432,932 | A | * | 7/1995 | Chen et al. ..................... | 718/103 |
| 5,715,386 | A | * | 2/1998 | Fulton et al. ................... | 714/38 |
| 6,016,503 | A | * | 1/2000 | Overby et al. ................. | 718/104 |
| 6,430,570 | B1 | * | 8/2002 | Judge et al. .................... | 717/166 |
| 6,457,142 | B1 | * | 9/2002 | Klemm et al. ................. | 714/38 |
| 6,594,787 | B1 | * | 7/2003 | Chesson ......................... | 714/56 |
| 6,629,266 | B1 | * | 9/2003 | Harper et al. .................. | 714/38 |
| 6,732,359 | B1 | * | 5/2004 | Kirkpatrick et al. .......... | 718/102 |
| 6,910,210 | B1 | * | 6/2005 | Chew ............................. | 718/103 |
| 6,938,254 | B1 | * | 8/2005 | Mathur et al. ................. | 718/104 |
| 7,000,100 | B2 | | 2/2006 | Lacombe et al. | |
| 7,003,775 | B2 | | 2/2006 | Lacombe et al. | |
| 7,069,543 | B2 | | 6/2006 | Boucher | |
| 7,096,471 | B2 | | 8/2006 | Kosanovic | |
| 7,111,307 | B1 | * | 9/2006 | Wang ............................. | 719/321 |
| 7,131,026 | B2 | | 10/2006 | Denninghoff et al. | |
| 7,181,743 | B2 | | 2/2007 | Werme et al. | |
| 7,257,692 | B2 | * | 8/2007 | Schumacher ................. | 711/170 |
| 7,269,758 | B2 | * | 9/2007 | Kadashevich ................. | 714/38 |
| 7,395,455 | B2 | * | 7/2008 | Nash et al. ..................... | 714/36 |
| 2002/0184295 | A1 | * | 12/2002 | Bartley ......................... | 709/107 |
| 2002/0184482 | A1 | * | 12/2002 | Lacombe et al. .............. | 713/1 |
| 2003/0028582 | A1 | * | 2/2003 | Kosanovic .................... | 709/105 |
| 2003/0037172 | A1 | * | 2/2003 | Lacombe et al. ............. | 709/310 |

(Continued)

OTHER PUBLICATIONS

Shankar Govindan: "Offensive Runways: Defensive DBA", Oracle Knowledge Base, Apr. 25, 2003, pp. 1-11, im Internet: http://oracle.ittoolbox.com/documents/peer-publishing/offensive-runaways-defensive-dba-2421#, recherchiert am Oct. 11, 2006.

(Continued)

*Primary Examiner* — Jue Louie
(74) *Attorney, Agent, or Firm* — Lempia Summerfield Katz LLC

(57) ABSTRACT

A data processor and method of controlling the performance of a data processor are provided. The data processor includes a memory that is operable to store at least two of the application programs and that can be executed on the data processor. A performance module is operable to monitor a performance flag and output a stop command as a function of the presence of the performance flag, wherein the performance module generates a command that terminates at least one of the application programs as a function of the outputting of a stop command.

22 Claims, 3 Drawing Sheets

(56) References Cited

U.S. PATENT DOCUMENTS

| | | | |
|---|---|---|---|
| 2003/0221141 A1* | 11/2003 | Wenisch | 714/47 |
| 2004/0073891 A1* | 4/2004 | Boucher | 717/127 |
| 2004/0205760 A1* | 10/2004 | Foote et al. | 718/104 |
| 2004/0221194 A1* | 11/2004 | Denninghoff et al. | 714/11 |
| 2004/0267548 A1 | 12/2004 | Jones | |
| 2006/0048017 A1* | 3/2006 | Anerousis et al. | 714/47 |
| 2006/0136886 A1* | 6/2006 | Patterson et al. | 717/141 |
| 2006/0136916 A1* | 6/2006 | Rowland et al. | 718/100 |
| 2006/0143606 A1* | 6/2006 | Smith et al. | 717/175 |
| 2006/0190482 A1* | 8/2006 | Kishan et al. | 707/103 Y |

OTHER PUBLICATIONS

German Office Action for DE 10 2005 045 904.8-53 dated Oct. 11, 2006.

English translation of German Office Action for DE 10 2005 904.8-53 dated Oct. 11, 2006.

German Office Action dated Dec. 4, 2013 for corresponding German Patent Application No. DE 10 2005 045 904.8 with English translation.

* cited by examiner

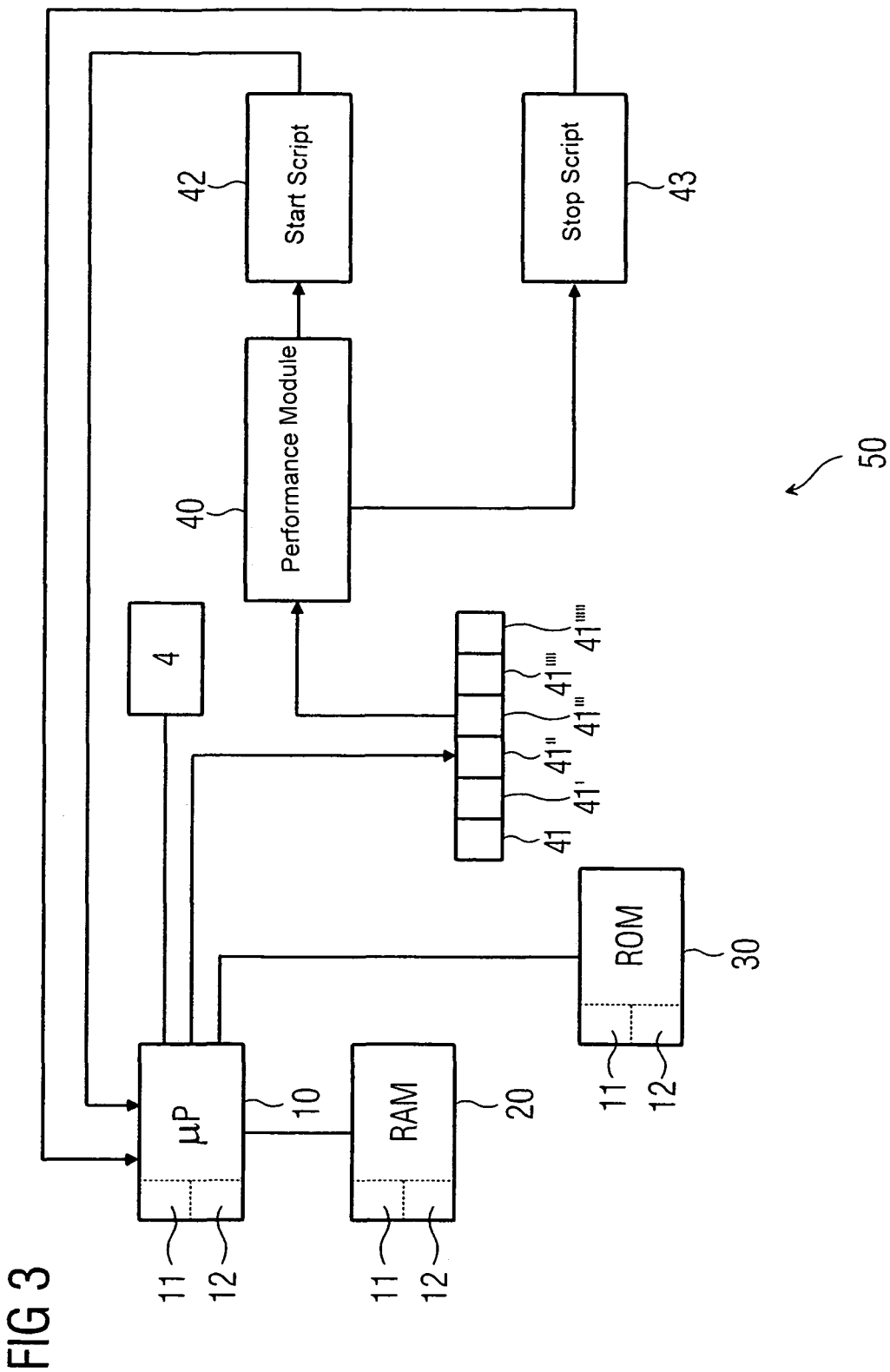

DATA PROCESSOR WITH PERFORMANCE CONTROLS

This application claims the benefit of DE 10 2005 045 904.8, filed Sep. 26, 2005, which is hereby incorporated by reference.

BACKGROUND

1. Field

The present embodiments relate to a data processor and to a method, both of which allow controlling the performance of the data processor.

2. Related Art

Data processing equipment (data processor), such as conventional personal computers (PC) or workstations have become more powerful. Nevertheless, application programs, hereinafter also simply called applications, require high performance, so that limitations in terms of computer hardware must still be tolerated. Utilization of the CPU (Central Processing Unit or microprocessor) in computation-intensive applications has limits, for example, the CPU is completely utilized. Utilization of the memory (i.e. RAM) is often completely utilized, and thus necessitates shifting memory to other memory devices, for example, hard drives.

Computation-intensive applications may be, for example, real-time simulations, image processing, or 3D simulations. Medical devices in radiology, for example, X-ray, CT, MR, PET, or ultrasound systems, perform computation-intensive applications. Control of this equipment is usually divided into two main components. One component makes the radiological scans, and another component controls the imaging equipment. Controlling the equipment involves various settings and making the actual images (scans) of a patient.

An essential task of imaging equipment in radiology is making a scan and then the ensuing image construction. Image construction includes the reconstruction of image data from the raw data obtained during the scan. Generally, image construction by reconstruction of image data has the greatest demands, for example, in terms of computer performance. Image construction often completely utilizes both the CPU and RAM. Full-capacity (complete) utilization of the CPU or RAM impairs the function of other applications running on the computer.

Phase delays and prolonged computation times for applications can occur during full-capacity utilization, for example, as in conventional PCs. Full-capacity utilization also affects controlling the scanning of a patient by the imaging equipment, for example, causes unintentionally lengthened exposure times. This leads to an unnecessarily increased radiation exposure for the patient. Repeat exposures are only desired, for example, to achieve the required scanning quality desired. Repeat exposure lead to additional loads on the patient and additional work for the medical personnel.

Comparable problems with more or less grave consequences may occur from overloading the particular computer and in other computation-intensive applications.

SUMMARY

The present embodiments relate to a data processor and method of controlling a data processor. The present embodiments may make it possible to control the power (performance) of a computer in such a way that obviates critical or threatening situations.

In one embodiment, a method for execution on a data processor on which at least two application programs are running, includes the following steps: A) monitoring a performance flag; B) outputting a stop command as a function of ascertaining a performance flag; and C) terminating at least one of the application programs as a function of outputting a stop command.

In another embodiment, a data processor includes a memory including at least two application programs that can be executed on the data processor, a performance module that is operable to monitor a performance flag and output a stop command as a function of the presence of the performance flag. The performance module generates a command for terminating at least one of the application programs as a function of the outputting of a stop command. In one embodiment, the performance flag can be in the form of a 0/1 piece of information, for example, by a single bit. Alternatively, the performance flag may also include additional information with respect to the application that has set the performance flag. Additional information may, for example, be provided by the position of the performance flag within a data word or data frame, or by adding a code that identifies the application in question.

Terminating one or more application programs includes, for example, forwarding a corresponding command to the application program, which "properly" shuts down the application, or by executing a kill command at the operating system level, which causes the immediate termination of the program, for example, in the worst case at the cost of data losses. Other ways of terminating applications are readily conceivable.

As broadly described herein, for example, the term "performance module" is an application program running at the operating system level or a higher level. For example, the performance module may also be a component of system management tools (SMS) or a component of an SMS, such as a managed node package (MNP). For example, the performance module may be implemented in a hardware component capable of assuring the capability of the module to function regardless of the CPU or memory utilization. The performance module is not limited to implementation into a hardware component, for example, other ways of implementing the performance module are conceivable.

In one exemplary embodiment, when forwarding a simple piece of information in the form of the performance flag, one or more application programs may be terminated intentionally in order to prevent a full-capacity utilization of the CPU or memory. For example, if a full-capacity utilization situation is detected, less-important applications are intentionally terminated in order to make the computer performance available for more-important, critical applications. For example, in medical equipment for radiology, the application for image construction by reconstruction of raw data is terminated to keep the computer power available for controlling the patient scan and thus preventing mistakes in the scan, such as excessive radiation doses.

In one exemplary embodiment, the performance flag is set as a function of the computer utilization, for example, by the performance module. In an alternative embodiment, the performance flag is set by an application that is critical and has sufficiently high priority to justify having other applications terminated. In another embodiment, depending on the application that has set a performance flag, applications depending on their importance or priority are terminated, while others are not terminated. For example, an application program of the highest priority may terminate all the applications by setting the performance flag, while an application program of lesser priority could terminate only a few application programs.

In one exemplary embodiment, the performance flag is set by an application program. The termination of applications may be a function of whether the critical program that is setting the performance flag is being started or is entering a critical phase, for example, performing a patient scan.

In one exemplary embodiment, the setting of the performance flag is a function of the outputting of the stop command. One or more application programs to be terminated are ascertained. The application programs to be ascertained may be in conjunction with setting of the performance flag or depend on outputting information that identifies the flag-setting application program. This creates greater flexibility because, depending on a priority or importance of the application program, certain application programs are terminated but others are not terminated.

In one embodiment, the method further includes: D) outputting a start command as a function of the deletion of a performance flag; and E) starting at least one of the application programs as a function of the outputting of a start command.

As broadly described herein, the term "deleting" is understood to mean resetting, restoration, or restoration of the status of the performance flag. For example, after the termination of a critical application, the termination of a critical application phase, or once it is no longer critical to keep computer performance available, a system status, having a critical application and also less-critical applications running, can be established or restored.

In one exemplary embodiment, after the deletion of the performance flag, one or more application programs to be started are ascertained as a function of the outputting of the start command. In one embodiment, the one or more application programs to be started are ascertained, optionally, as a function of information that identifies the application program that deletes the flag. A system status can be established that is typically meant to prevail after a phase in which computer performance had to be kept available is terminated. In an alternate embodiment, the system status is ascertained as a function of the application program that has deleted the performance flag, so a status that is typically supposed to prevail after the termination of that application program or a critical phase of that application program is established. For example, after the deletion of the performance flag, of restoring whatever system status prevailed before the performance flag was set.

The term "system status" is broadly defined herein as application programs that are currently active on the computer. A system status suitable for a particular workflow can also be established that is adapted to workflow steps which typically follow after the application program or the critical phase of the application program that has deleted the flag has been terminated because of the dependency on the application program that has deleted the flag.

BRIEF DESCRIPTION OF THE DRAWINGS

FIG. 3 illustrates a schematic data processor with a performance module.

DETAILED DESCRIPTION

Figure 1:
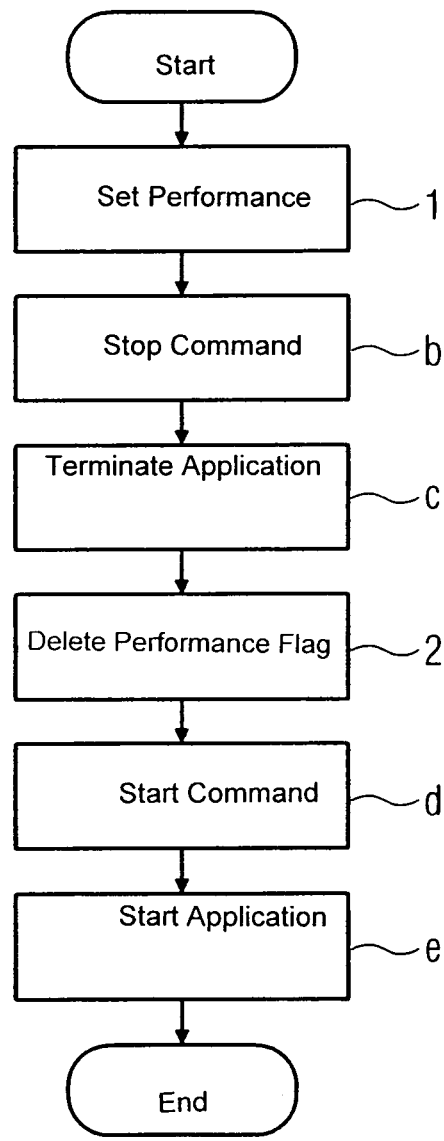
FIG. 1 illustrates a method when a performance flag is employed according to one embodiment.

FIG. 1 illustrates a method for using a performance flag. Once the method is started, for example, by detection of a full-capacity utilization situation or starting a critical application, a performance flag is set (1). The performance flag or its status is monitored by an agent, which reacts to changes in the flag. If the flag is found, a stop command is output (b).

Depending on the outputting of the stop command, the application is terminated (c), for example, by forwarding a corresponding command to the application or to the operating system. By terminating the application, computer performance, for example, CPU or RAM capacity is kept available. The available computer capacity is available, for example, to another, more-important or more-critical, application.

The performance flag is deleted or reset, or its status is reset (2). The performance flag is deleted, for example, after detection of the end of the full-capacity utilization situation or after termination of the application program or of a critical phase of the application program. The performance flag is monitored, and after it is found that it has been deleted a start command is output (d).

In one embodiment, an application is started as a function of the outputting of the start command (e). The starting of the application is performed by outputting a corresponding command to the operating system, or a start script intended for the purpose can be started. For example, upon execution of the corresponding command or start script, one or more application programs are started.

Figure 2:
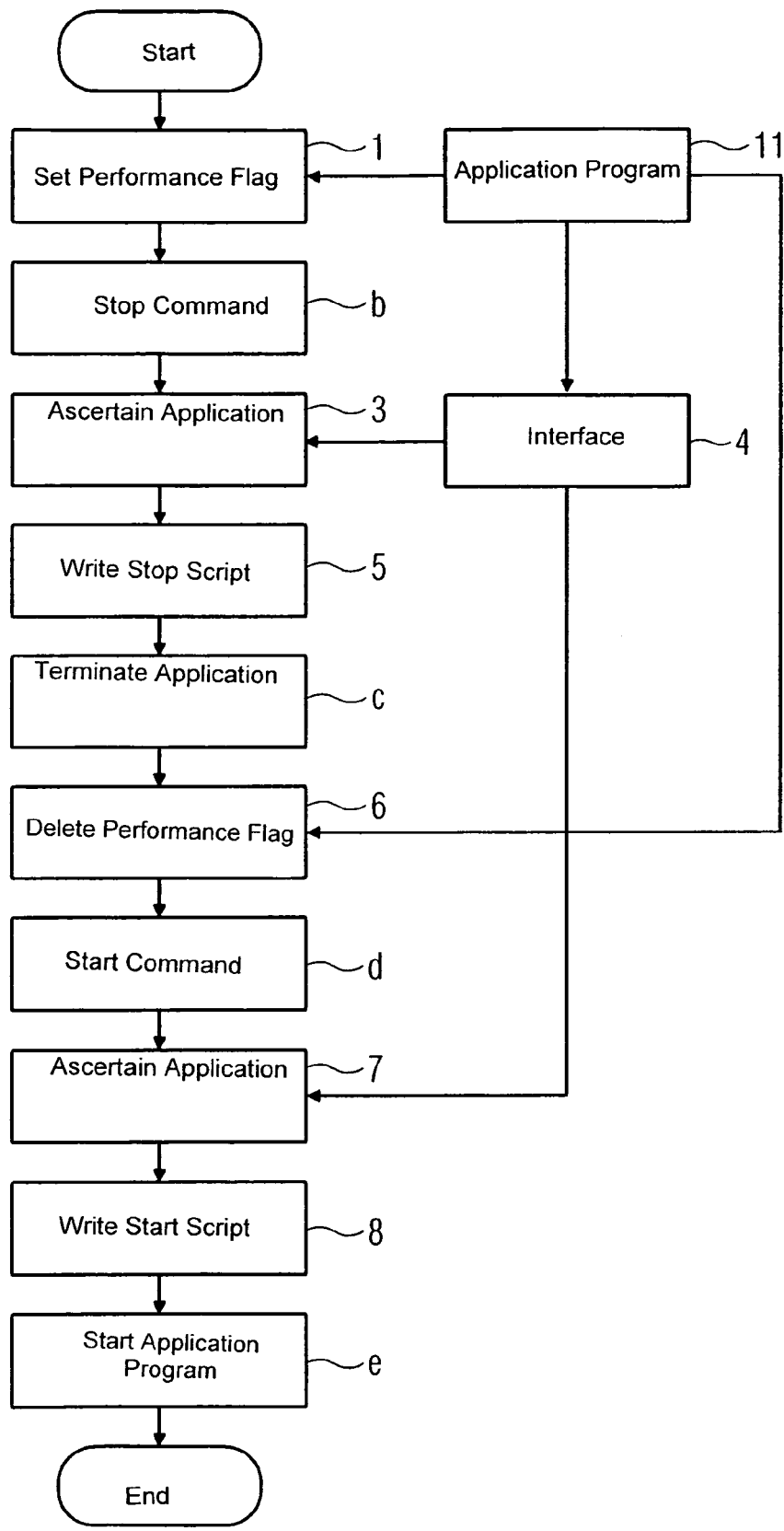
FIG. 2 illustrates a method when a performance flag is employed as a function of an application program according to one embodiment.

In one embodiment, as shown in FIG. 2, a method includes an application (11) that causes the performance flag to be set (1). Once the performance flag is found, a stop command is output (b).

One or more applications are ascertained as a function of the outputting of the stop command (3). In one embodiment, the one or more applications that are ascertained are also dependent on an interface (4), from which the one or more applications, or a list of applications, can be consulted. The interface (4) is described by the application (11) that previously set the performance flag, or is described as a function of the particular application. Using the interface (4), depending on the application (11) that is setting the flag, it is ascertained which other applications should be terminated. In an alternate embodiment, the interface (4) is dependent on the application (11) and other applications, so that when the flag is set by the other applications, other lists of applications to be terminated can logically be created.

In one embodiment, a stop script is written depending on the applications ascertained (5). The applications to be terminated are entered in the stop script. The stop script does not have to be separately written, except for the list of applications to be terminated. Alternatively, the stop script can be available from the very beginning. For example, the stop script can be generated by the performance module.

The applications to be terminated are terminated by execution of the stop script (c), for example, by forwarding a command to the application or to the operating system. In one exemplary embodiment, whether the particular application is "properly" shut down by forwarding a corresponding command or is abruptly interrupted by forwarding a kill command to the operating system is dependent on which application has set the performance flag. For example, in critical applications, it may be necessary to provide the highest possible computer performance available as fast as possible, while with less-critical applications it may be sufficient to make the computer performance available only after the time needed for shutting down the applications has elapsed.

In one embodiment, the application (11) causes the performance flag to be deleted again (6). This can be done for instance when the application (11) ends or when a critical phase of the application (11) has ended. For example, application (11) may be performing a patient scan using a radiation-based imaging system. In one embodiment, the performance flag is set at the beginning of a patient scan and deleted again once the scan is concluded.

In one embodiment, a start command is output depending on whether the performance flag has been deleted (d). One or more applications or a list of applications that are to be started is ascertained depending on the outputting of the start command (7). The list of applications to be started is dependent on the interface (4), which is described by the application (11) that causes the performance flag to be deleted. The list of applications to be started is thus dependent on application (11). For example, the application that sets the performance flag is identical to the application that deletes the performance flag. Alternatively, the flag is set by a first application but deleted by a second application.

The application or applications are written in a start script depending on the list of applications to be started that is ascertained (8). The start script, like the stop script, for example, can already be available from the beginning, so that only the applications to be started have to be entered.

The starting of the entered applications is brought about by executing, for example, the start script (e). This is done by forwarding corresponding commands to the operating system.

In one embodiment, as shown in FIG. 3, a data processor includes a performance module (40). The data processor includes a microprocessor (i.e. CPU) (10), in which applications (11, 12) are running. The microprocessor (10) is connected to a working memory (i.e. RAM) (20), in which application data for the applications (11, 12) are stored in the memory or buffer-stored. The microprocessor (10) is connected to a memory (i.e. ROM) (30), in which executable versions of the application programs (11, 12) are stored.

In one embodiment, the microprocessor (10) sets a performance flag (41, 41', 41" . . . ) depending on a corresponding call for one of the application programs (11, 12). For example, it may be sufficient for only a single performance flag with only 0/1 information to be available. In the exemplary embodiment shown in FIG. 3, a data word composed of a series of performance flags (41, 41', 41", . . . ) is used, and depending on which of the applications (11, 12) sets the flag, one of the various flags is set. The position of the flag set within the series of flags identifies the application (11, 12) that has set the flag. For example, flag (41) can be allocated to the application (11), and flag (41') to the application (12). In this embodiment, for example, if flag (41) is set, it is clear that it was set by application (11) and if flag 41' is set, it is clear that it was set by application (12).

In one embodiment, a performance module 40 monitors the flags (41, 41', 41" . . . ) to determine whether one of them has been set. If the performance module (40) finds a set performance flag (41, 41', 41" . . . ) then it reads out the interface (4) in order to obtain a list of applications to be terminated. The performance module (40) writes the applications to be terminated into the stop script (43) and causes the stop script (43) to be executed. The applications entered are terminated by execution of the stop script (43).

In one embodiment, if the performance module (40) finds that a performance flag (41, 41', 41" . . . ) has been deleted, then it reads out the interface to obtain a list of applications to be started. The performance module (40) then writes the applications to be started into the start script (42) and causes that script to be executed. By execution of the start script (42), the entered applications are started.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method that is executable on a data processor including at least two running application programs, the method comprising:
    monitoring a performance flag;
    setting, by a first running application program of the at least two running application programs, the performance flag when the first running application program is entering a critical phase, the first running application program is a critical application program having a priority;
    generating a stop command as a function of ascertaining the performance flag;
    outputting the stop command;
    ascertaining at least a second running application program of the at least two running programs, the second running application program having a priority that is lower than the priority of the first running application program;
    terminating the ascertained second running application program in response to outputting the stop command prior to the second running application program becoming unresponsive and in order to prevent a full-capacity utilization of a central processing unit or a random access memory of the data processor, the first running application program not being terminated in response to outputting the stop command; and
    deleting the performance flag based on detection of a termination of the first running application program or the first running application program exiting the critical phase.

2. The method as defined by claim 1, further including: ascertaining the second running application program to be terminated as a function of the outputting of the stop command.

3. The method as defined by claim 2, further including: outputting information identifying the first running application program, in conjunction with the setting of the performance flag by the first running application program.

4. The method as defined by claim 3, further including: ascertaining the second running application program to be terminated as a function of the outputting of the stop command and of the information identifying the first running application program.

5. The method as defined by claim 4, further including: entering one or more corresponding entries in a stop script as a function of ascertaining the second running application program to be terminated.

6. The method as defined by claim 5, further including:
    executing the stop script; and
    terminating the second running application program as a function of the one or more corresponding entries in the stop script.

7. The method as defined by claim 1, further including:
    outputting a start command; and
    starting at least one application program as a function of the outputting of the start command.

8. The method as defined by claim 7, wherein outputting the start command is a function of the deleting, and
    wherein the deleting is a running application program of the at least two running application programs.

9. The method as defined by claim 8, further including: ascertaining the at least one application program to be started as a function of the outputting of the start command.

10. The method as defined by claim 9, further including: outputting information identifying the at least one application program to be started in conjunction with the deletion of the performance flag by the running application program.

11. The method as defined by claim 10, further including: ascertaining the at least one application program to be started as a function of the outputting of the start command and as a function of the information identifying the at least one application program to be started.

12. The method as defined by claim 11, further including: entering one or more corresponding entries in a start script as a function of ascertaining the at least one application program to be started.

13. The method as defined by claim 12, further including: executing the start script; and
starting the at least one application program as a function of the one or more corresponding entries in the start script.

14. A data processor comprising:
a central processing unit;
a memory;
at least two application programs stored in the memory and executing on the data processor, a first application program of the at least two application programs being configured to set a performance flag when the first application program is entering a critical phase, the first application program is a critical application program having a priority; and
a performance module configured to monitor the performance flag and output a stop command as a function of the presence of the performance flag,
wherein the performance module is configured to ascertain at least a second application program of the at least two application programs, the second application program having a priority that is lower than the priority of the first application program, the performance module is further configured to generate a command that terminates the ascertained second application program as a function of the outputting of the stop command prior to the second running application program becoming unresponsive and in order to prevent a full-capacity utilization of the memory of the data processor, the first application program not being terminated as a function of the outputting of the stop command, and
wherein the first application program is configured to cause the performance flag to be deleted, such that the performance flag is deleted based on detection of a termination of the first application program or the first application program exiting the critical phase.

15. The data processor as defined by claim 14, wherein the performance module is configured to ascertain the second application program to be terminated as a function of the stop command that is output.

16. The data processor as defined by claim 15, further including a stop script, wherein the performance module is configured to enter one or more corresponding entries in the stop script as a function of ascertaining the second application program to be terminated.

17. The data processor as defined by claim 16, wherein the stop script is configured to terminate the second application program as a function of a corresponding entry in the stop script.

18. The data processor as defined by claim 17, wherein the performance module is configured to output a start command as a function of a deletion of the performance flag, and
wherein the performance module is configured to generate a command that starts an application program of the at least two application programs as a function of the outputting of the start command.

19. The data processor as defined by claim 18, wherein the performance module is configured to ascertain the application program to be started as a function of the outputting of the start command.

20. The data processor as defined by claim 19, further including a start script,
wherein the performance module is configured to enter one or more corresponding entries in the start script as a function of ascertaining the application program to be started.

21. The data processor as defined by claim 20, wherein the application program to be started is configured to be started as a function of a corresponding entry in the start script by execution of the start script.

22. A method that is executable on a data processor including at least two running application programs for radiological medical equipment, the method comprising:
monitoring a performance flag;
setting, by a first running application program of the at least two running application programs, the performance flag when the first running application program is entering a critical phase, wherein the first running application program is a critical application program having a priority, and the first running application program comprises controlling a patient scan;
generating a stop command as a function of ascertaining the performance flag;
outputting the stop command;
ascertaining at least a second running application program of the at least two running programs, the second running application program having a priority that is lower than the priority of the first running application program;
terminating the ascertained second running application program in response to outputting the stop command prior to and in order to prevent a full-capacity utilization of a central processing unit or a random access memory of the data processor, the first running application program not being terminated in response to outputting the stop command; and
deleting the performance flag based on detection of a termination of the first running application program or the first running application program exiting the critical phase.

* * * * *